United States Patent
Damitz et al.

(10) Patent No.: US 7,881,855 B2
(45) Date of Patent: Feb. 1, 2011

(54) METHOD FOR METERING FUEL INTO COMBUSTION CHAMBERS OF AN INTERNAL COMBUSTION ENGINE

(75) Inventors: Jens Damitz, Illingen (DE); Matthias Schueler, Steinheim (DE); Christian Mader, Gerlingen (DE); Michael Kessler, Weissach (DE); Vincent Dautel, Stuttgart (DE); Arvid Sievert, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 12/090,507

(22) PCT Filed: Nov. 16, 2006

(86) PCT No.: PCT/EP2006/068549

§ 371 (c)(1),
(2), (4) Date: Aug. 14, 2008

(87) PCT Pub. No.: WO2007/071502

PCT Pub. Date: Jun. 28, 2007

(65) Prior Publication Data

US 2009/0301430 A1 Dec. 10, 2009

(30) Foreign Application Priority Data

Dec. 15, 2005 (DE) .................. 10 2005 059 908

(51) Int. Cl.
*G06F 19/00* (2006.01)
*F02D 41/26* (2006.01)
*F02D 41/40* (2006.01)
*F02M 51/00* (2006.01)

(52) U.S. Cl. .................. 701/104; 701/111; 123/299; 123/435; 123/480

(58) Field of Classification Search .................. 123/299, 123/300, 435, 436, 445, 446, 467, 478, 480, 123/486, 492, 493; 701/101–105, 110, 111, 701/114, 115
See application file for complete search history.

(56) References Cited

U.S. PATENT DOCUMENTS

| 4,785,784 A | * | 11/1988 | Nanyoshi et al. ............. 123/478 |
| 6,718,946 B2 | * | 4/2004 | Hokazono et al. ........... 123/445 |
| 6,763,799 B2 | * | 7/2004 | Ito et al. ...................... 123/299 |

(Continued)

FOREIGN PATENT DOCUMENTS

DE 102004001119 8/2005

(Continued)

OTHER PUBLICATIONS

International Search Report, PCT International Patent Application No. PCT/EP2006/068549, dated Mar. 14, 2007.

*Primary Examiner* — Willis R Wolfe, Jr.
(74) *Attorney, Agent, or Firm* — Kenyon & Kenyon LLP

(57) ABSTRACT

A method and control unit for metering fuel into at least one combustion chamber of an internal combustion engine comprising at least one pilot injection and one main injection per combustion cycle, combustion features being detected and an effect of a fuel quantity injected prior to the main injection being ascertained from the combustion features. An actual value of a combined effect of at least two pilot injections per combustion cycle is ascertained and the actual value is regulated to a setpoint value via an intervention on at least one of the pilot injections.

10 Claims, 3 Drawing Sheets

U.S. PATENT DOCUMENTS

| | | |
|---|---|---|
| 6,820,592 B2 | 11/2004 | Buck et al. |
| 7,066,138 B2 | 6/2006 | Damitz et al. |
| 7,257,479 B2 * | 8/2007 | Damitz et al. ............... 701/105 |
| 7,269,498 B2 | 9/2007 | Damitz et al. |
| 7,337,767 B2 * | 3/2008 | Magarida et al. ............ 123/299 |
| 7,497,199 B2 * | 3/2009 | Canale et al. ............... 123/299 |

FOREIGN PATENT DOCUMENTS

| | | |
|---|---|---|
| EP | 1316704 | 6/2003 |
| EP | 1344922 | 9/2003 |
| EP | DE 10305656 | 1/2004 |
| EP | 1531253 | 5/2005 |
| JP | 2001123871 | 5/2001 |

* cited by examiner

METHOD FOR METERING FUEL INTO COMBUSTION CHAMBERS OF AN INTERNAL COMBUSTION ENGINE

FIELD OF THE INVENTION

The present invention relates to a method and a control unit for metering fuel into at least one combustion chamber of an internal combustion engine.

BACKGROUND INFORMATION

German Patent Application No. DE 103 05 656 A1 describes such a method. According to this document, signals of a structure-borne noise sensor system coupled to the internal combustion engine are used as combustion features. German Patent Application No. DE 103 05 656 justifies this by stating that a simple relationship exists between a combustion noise emission and a fuel quantity of a pilot injection. To ascertain the injected fuel quantity, the signal of the structure-borne noise sensor system is detected and filtered in at least one first crankshaft angle range (measuring window) which is associated with the pilot injection, and in at least one second crankshaft angle range which is associated with a main injection.

Depending on the fuel quantities injected in the pilot injection and the main injection, a certain pattern of combustion features is obtained, from which a conclusion may be drawn on the injection points and injection quantities via comparison with reference patterns, so that the pilot injection may be corrected in a closed loop. This method is described in German Patent Application No. DE 103 05 656 using the example of an injection pattern composed of a pilot injection and a main injection. It should be applicable, however, to any desired combination of a first partial injection and at least one second partial injection, German Patent Application No. DE 103 05 656 mentioning pilot injections, main injections, and post-injections as partial injections elsewhere. Applicability of the method to two pilot injections is not mentioned in German Patent Application No. DE 103 05 656.

In addition to German Patent Application No. DE 103 05 656, a use of structure-borne noise sensors for the purpose of regulation in gasoline engines has been industrially used for years, for example, for knock control. In diesel engines, only systems having structure-borne noise regulation which corrects a single pilot injection per combustion are on the market.

To reduce the combustion noise, the implementability of two pilot injections per combustion is being increasingly required from vehicle manufacturers.

The pilot injection quantities are set via control times of electrically controllable injectors. Due to tolerances and aging (drift) of the injection system's components, an actual relationship between injected quantity and control time differs from a relationship that is stored, for example, in an injector characteristics map. A deterioration of the emissions (exhaust gas and noise) may result. This applies in particular to changes in the pilot injection quantities.

In addition to a drift of the injectors, a pressure wave in the injection system triggered by the injection affects the subsequent injections. In operation using a single pilot injection per combustion, these pressure waves may be corrected with the aid of fixed correction values ascertained on a test bench to the point that they have almost no negative effect on the main injection.

In systems having two pilot injections per combustion, however, considerable inaccuracies occur in the second pilot injection due to the pressure wave triggered by the first pilot injection. A correction of these inaccuracies using fixedly predefined correction values is not sufficiently accurate because the effect is a function of a plurality of influencing variables such as fuel temperature, fuel pressure, and fuel quality, which cannot be taken account using an acceptable degree of complexity.

A need therefore exists for an improved correction of the inaccuracies of pilot injections when at least two pilot injections are used. In tests using the method described in German Patent Application No. DE 103 05 656, it has been found that the effects of a plurality of consecutive pilot injections cannot be clearly separated in the structure-borne noise signal. This is explained by the fact that a plurality of pilot injections often combust in a very narrow angular range, so that their effect cannot be clearly separated in the cylinder pressure and in particular in the structure-borne noise.

SUMMARY

Against this background, an object of the present invention is to provide a method using which a pilot injection quantity may be corrected with increased accuracy during the operation of the internal combustion engine if the pilot injection quantity is divided into at least two pilot injections per combustion cycle.

According to an example embodiment of the present invention, in first approximation, the effect of a plurality of pilot injections may be treated as a superposition of the effects of the individual combustions. The example embodiment of the present invention thus allows cylinder-individual or combustion chamber-individual adjustment of a sum of fuel quantities which are metered using a plurality of pilot injections of an injection pattern.

Using intervention in one of a plurality of pilot injections, a certain split of the injection quantities into a plurality of pilot injections may be corrected. For example, if too little fuel is systematically injected in a second pilot injection, an increasing intervention occurs in the second fuel quantity. The systematic error may occur, for example, as a result of an effect of pressure waves of a pilot injection on a subsequent pilot injection.

Alternatively, the intervention may also occur symmetrically on a plurality of pilot injections or may be divided in a predetermined manner. By using test correction values, it may be checked whether small test changes are reflected in the combustion features. If this is not the case, the corresponding pilot injection may be extended at the expense of other pilot injections. This ensures that all pilot injections are actually effective and are not inactive, for example, due to a control time inadmissibly strongly corrected downward. In any case, the correction refers to both an injection drift (hydraulic drift) and to a correction of effects of pressure waves.

In addition, the example method may offer the advantage that the correction is available from the new condition over the entire service life of the vehicle. The example method thus compensates for both new component tolerances and aging drifts. Fuel temperature effects may also be corrected via a suitably adjusted correction frequency.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
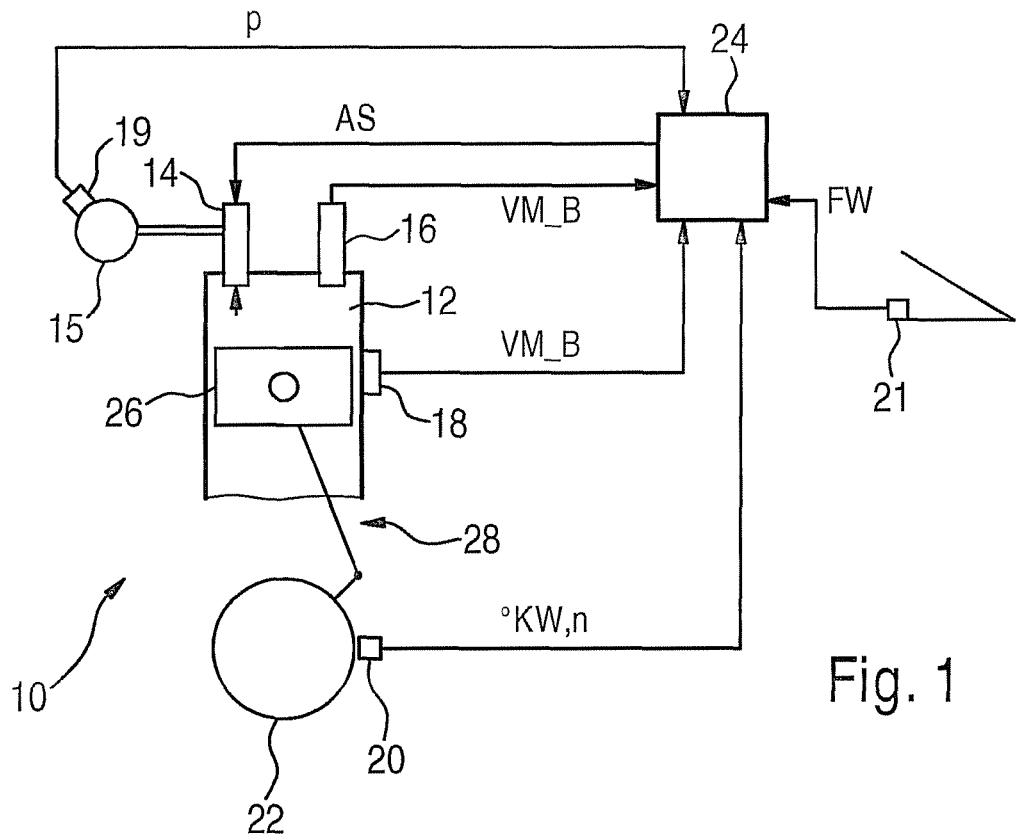
FIG. 1 schematically shows the technical field of the present invention.

In particular, FIG. 1 shows an internal combustion engine 10 having at least one combustion chamber 12, an injector 14, a pressurized fuel reservoir 15, combustion feature sensors 16 and/or 18, a fuel pressure sensor 19, an angle sensor system 20 on a component 22 which rotates synchronously with the cycles of internal combustion engine 10, a driver's intent transducer 21, and a control unit 24. Combustion chamber 12 is movably sealed by a piston 26, which is connected to component 22 via a crank mechanism 28. Such a component 22 is non-rotatably connected to a crankshaft of the internal combustion engine. In another example embodiment, it may, however, be connected to a camshaft of internal combustion engine 10. It is understood that actual internal combustion engines 10 have additional components such as gas exchange valves and associated actuators for controlling a change of charges of combustion chamber 12, which are not shown in FIG. 1 for the sake of clarity.

According to the present invention, control unit 24 outputs control signals AS in the form of pulse widths for pilot injections VE1, VE2, a main injection HE, and possibly other partial injections of an injection pattern, using which fuel is metered for combustion in combustion chamber 12. Combustion feature sensor 16 is a combustion chamber pressure sensor, while combustion feature sensor 18, which is present as an alternative or additionally, is a structure-borne noise sensor. Both sensors 16, 18 deliver base values or raw values VM_B of combustion features to control unit 24.

In the example embodiment of FIG. 1, angle sensor system 20 delivers crankshaft angle information ° KW as information about the position of piston 26 in its operating cycle. It is understood that this information may be derived not only from the crankshaft angle information, but, for example, also from camshaft angle information. Information about rotational speed n of the internal combustion engine may also be derived from the angle signal. Driver's intent FW represents a measure of a torque request by the driver and is detected, for example, as a gas pedal position.

Figure 2:
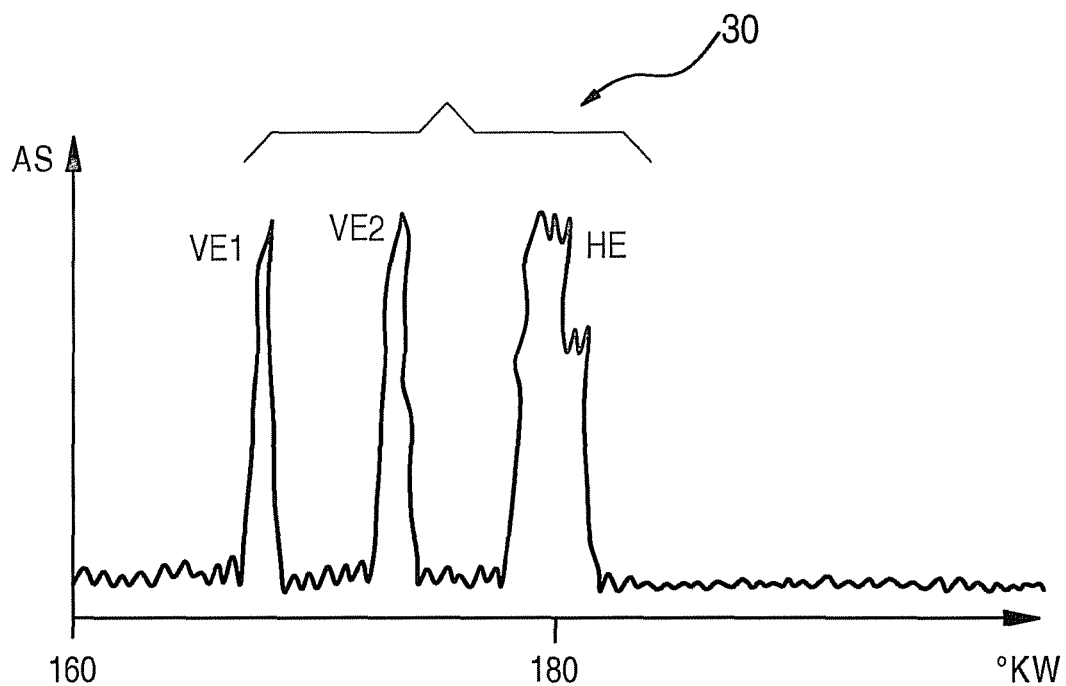
FIG. 2 schematically shows an injection pattern having two pilot injections and a main injection."

FIG. 2 illustrates a typical injection pattern 30 such as used in the environment of FIG. 1 in predefined operating states of internal combustion engine 10. In FIG. 2, control signals AS for injector 14 from FIG. 1 are plotted against crankshaft angle ° KW. At low values of the control signal, injector 14 is closed, while it is opened by pulses VE1, VE2 and HE for injection of fuel. Pulses VE1 and VE2 correspond to the above-named pilot injections and pulse HE corresponds to the above-named main injection. The value of 180° KW of the crankshaft corresponds to the top dead center TDC of the movement of piston 26 between the compression stroke and the working stroke. In passenger cars, the start of main injection HE is up to 15° before TDC; the pilot injections are also in a narrow angle range before TDC. Due to the pilot injections still taking place during the compression stroke, the pressure and temperature level in combustion chamber 12 are increased at the time of the main injection, which shortens the so-called ignition delay, i.e., the time interval between the start of the main injection and the start of its combustion. The combustion noises in particular are thus reduced.

Figure 3:
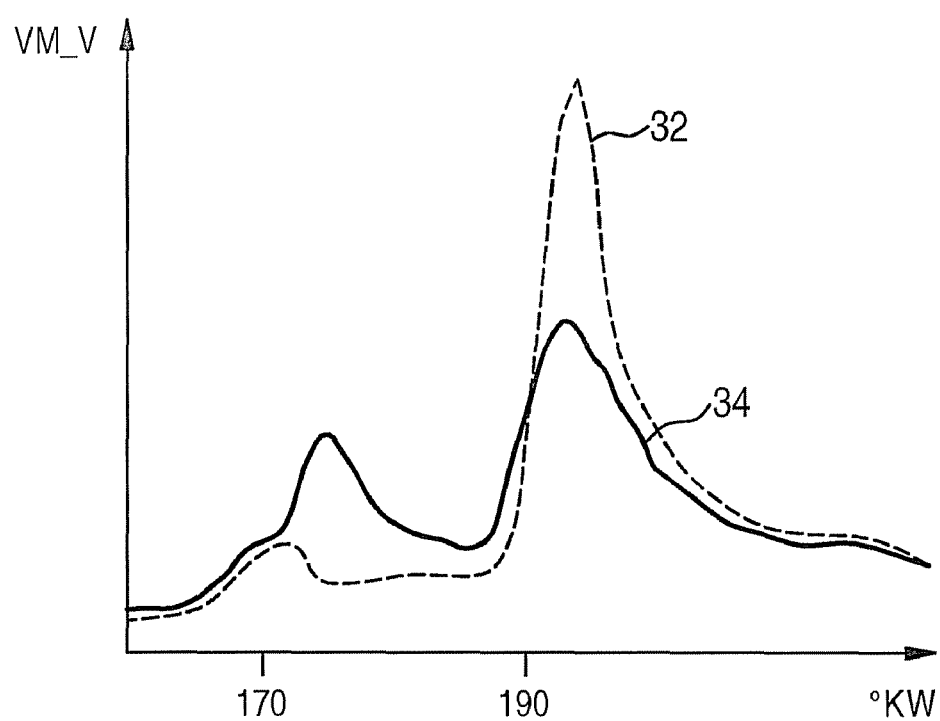
FIG. 3 schematically shows illustrations of such injection patterns in a curve of processed combustion features over an angular range.

FIG. 3 illustrates the way such injection patterns are reflected in a curve of processed combustion features VM_V over a crankshaft angle range. Here the peaks represent effects of the injections on the pressure variation in combustion chamber 12, the release of heat, and/or the combustion noise emission. In this sense, the terms combustion feature, effect of a fuel quantity, and fuel quantity may be used as synonyms. Processed combustion features VM_V result from base values VM_B via filtering, absolute value formation, and from base values (VM_B) of combustion features via averaging over a plurality of work cycles as described in German Patent Application No. DE 103 05 656.

Curves 32 and 34 of processed combustion features VM_V result for injection pattern 30 having different splits of a total fuel quantity to be injected into three partial injections VE1, VE2, and HE. In this case, the fuel quantity injected with first pilot injection VE1 has been kept constant, while fuel quantities M_VE2 and M_HE injected with second pilot injection VE2 and with main injection HE are varied complementarily to each other.

In the case of curve 32, fuel quantity M_VE2 injected with the second pilot injection is small. Generally, only the combustion feature of VE1 and a relatively large combustion feature of main injection HE can be seen. The magnitude of the combustion feature of HE shows a relatively high combustion noise and/or a steep pressure increase in combustion chamber 12. Both result from a relatively poor pre-conditioning of the combustion due to the small or zero quantity of M_VE2.

In the case of curve 34, however, M_VE2 is larger, which results in better pre-conditioning and thus in a lower combustion noise of the quantity V_HE. The greater pilot injection quantity M_VE2 is also reflected in a greater combustion feature of the pilot injections. However, it can also be seen that the first and second pilot injections are not resolved in the curve of combustion feature 34, i.e., cannot be separated from each other.

Figure 4:
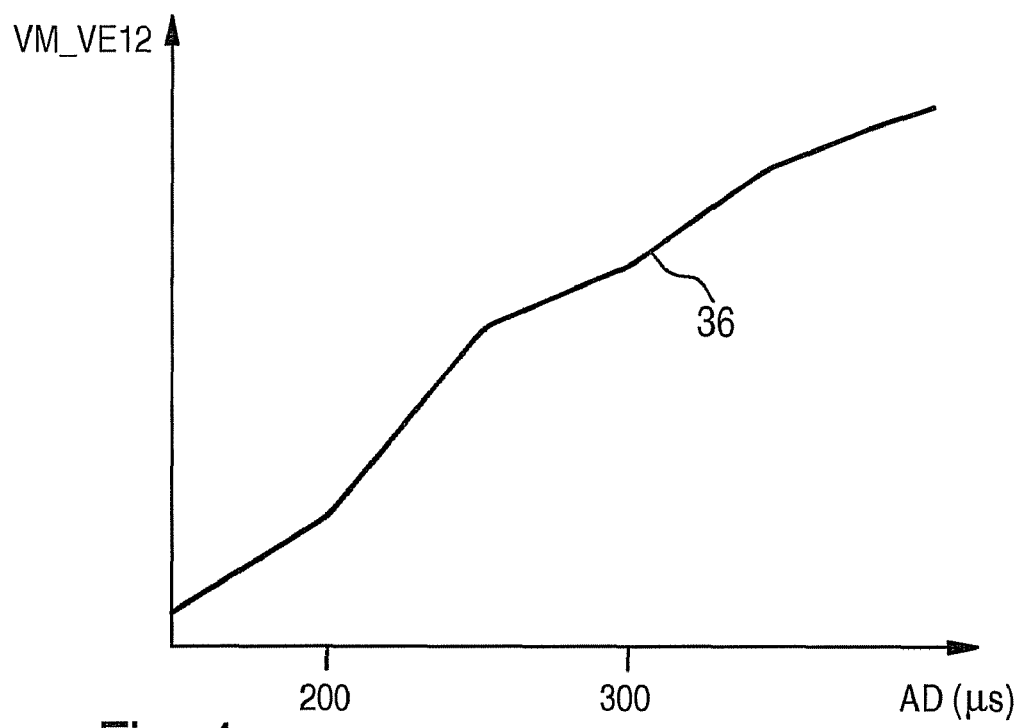
FIG. 4 qualitatively shows a change in the combustion features with changes in the pilot injection.

FIG. 4 qualitatively shows a curve 36 of a further processed combustion feature VM_VE12 over a control time AD of injector 14 for second pilot injection VE2 in microseconds at constant first pilot injection VE1.

In this example embodiment, which works with a structure-borne noise sensor 18, combustion feature VM_VE12 results qualitatively as a quotient of two areas from FIG. 3, the area under the peak of the pilot injections being in the numerator and the area under the peak of the main injection being in the denominator. In other words: VM_VE12 represents in this case a measure, normalized to the area under the peak of the main injection, of the sum of the two pilot injections VE1 and VE2. The peak of the main injection serves in this case as the reference combustion feature. The rising curve of VM_VE12 in FIG. 4 reflects the increase in the peak of the pilot injections with a decreasing peak of the main injection.

Figure 5:
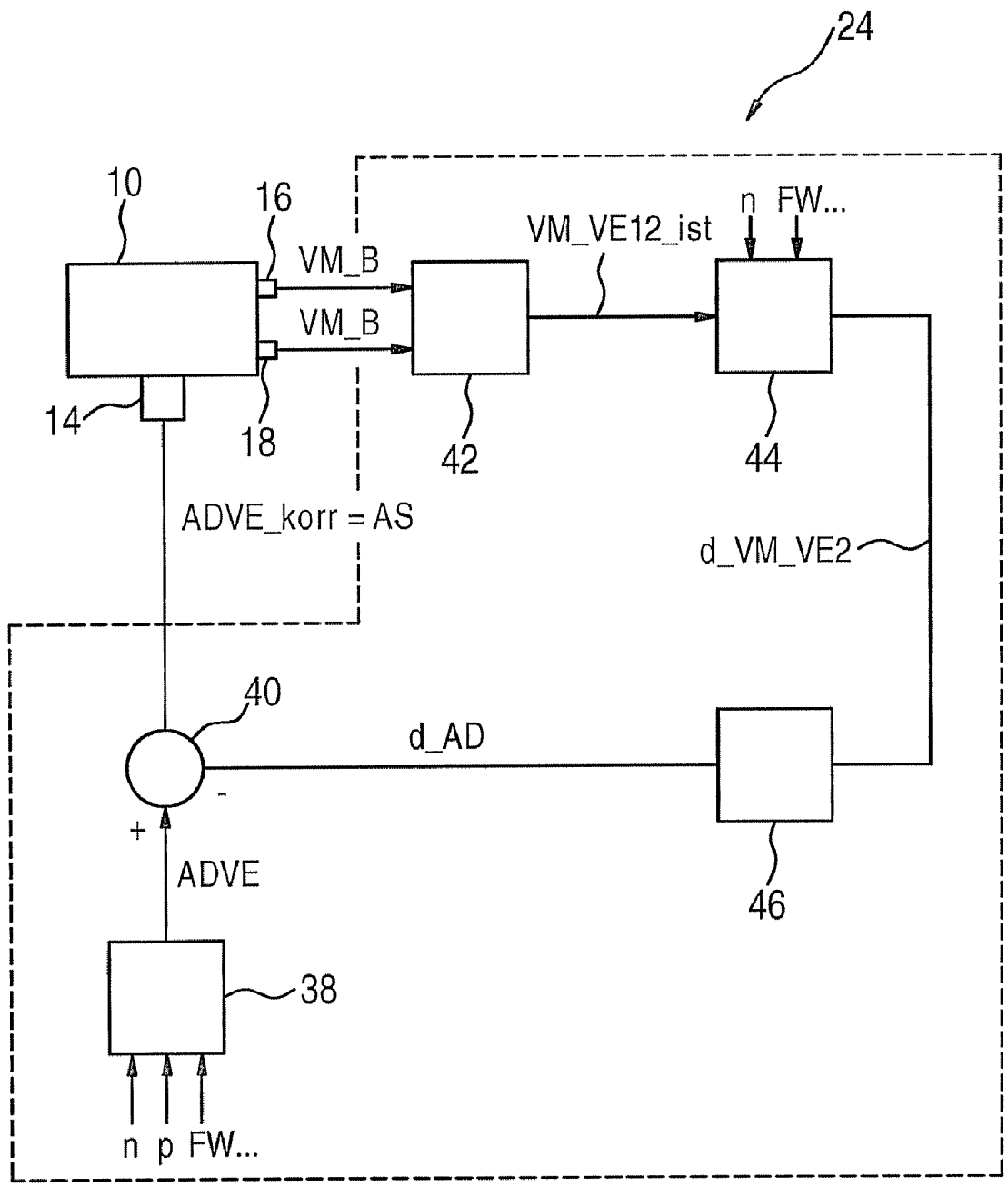
FIG. 5 shows a closed loop for correcting pilot injections.

In the example embodiment that works with combustion chamber pressure sensors 16, combustion feature VM_VE12 corresponds to an amount of heat released by the sum of the two pilot injections. This amount of heat may be determined from the combustion chamber pressure signal. Contrary to the analysis of structure-borne noise signals, no normalization is required in this case. FIG. 5 shows a closed loop for correcting pilot injections VE1, VE2, which has internal combustion engine 10, at least one combustion feature sensor 16, and/or 18, and control unit 24. Control unit 24 has, among other things, a base value transducer 38, which provides base values ADVE (pilot injection control time) for control times for pilot injections VE1, VE2 as a function of performance parameters of internal combustion engine 10. Base value transducer 38 is a characteristics map for example, which is addressed via values of rotational speed n, driver's intent FW, and optionally other performance parameters of internal combustion engine 10 such as fuel pressure p. Base value ADVE is gated with a correction value d_AD in a node 40, the gate being multiplicative or additive, depending on the way d_AD is generated.

Injector 14 is controlled using the result AD_VE_corr of the gating, which results, for example, in first pilot injection VE1 or second pilot injection VE2. The combustion features resulting from the combustion are detected by combustion feature sensor 16 and/or 18 as base values VM_B and relayed to a block 42 of control unit 24, which represents a signal conditioning and filtering. Base values VM_B of combustion features are detected in defined subranges of a work cycle of internal combustion engine 10, which may be defined by certain crankshaft angle ranges, for example. The subranges are preferably selected in such a way that one subrange contains the peak of the pilot injections and another subrange contains the peak of the main injection.

In block 42, the base values are modified by filtering, absolute value formation, and optionally by averaging over a plurality of work cycles, and the above-named normalization is modified to the processed combustion features VM_V and then to the further processed combustion features VM_VE1, VM_VE12. When combustion chamber pressure sensors 16 are used, block 42 is used in particular for determining a feature which characterizes the heat release. In the conversion, processed combustion features VM_V are normalized in particular to reference combustion features; the reference combustion feature may be derived alternatively from a pressure curve or a noise curve of main injection HE or from a background pressure or background noise curve.

Block 42 delivers, among other things, actual values VM_VE12_actual for the combined effect of at least two pilot injections VE1, VE2. This actual value VM_VE12_actual is compared in block 44 with a setpoint value VM_VE12_setpoint, which is also formed as a function of rotational speed n, driver's intent FW, and/or optionally other performance characteristics of internal combustion engine 10. As a result of the comparison, block 44 outputs, for example, a system deviation d_VM_VE12 as a difference of VM_VE12_setpoint less VM_VE12_actual.

This system deviation d_VM_VE12 is used as an input quantity for a regulator 46. Regulator 46 outputs the above-mentioned correction value d_AD as a manipulated variable, using which the base value provided by base value transducer 38 is corrected for at least one of the pilot injections. The combined effect is thus set to setpoint value VM_VE12_setpoint for at least two pilot injections per combustion cycle in a closed loop. The intervention, i.e., gating of a base value from block 38 with correction value d_AD may thus take place for all pilot injections of a combustion cycle. The intervention may be either symmetrical or asymmetrical in a predefined way. In the case of asymmetric split, it is preferably stronger for a subsequent pilot injection because it may be influenced by pressure waves of a preceding pilot injection. On the other hand, the effect of the preceding pilot injection is better predeterminable and responds to aging phenomena less sensitively.

Ongoing corrections may result in a corrected control time ADVE_corr=As, which is no longer sufficient for opening an injector 14, so that, for example, only one of two pilot injections is active. Noise emissions would increase, for example, as a result. To prevent this undesirable effect, in one example embodiment, each pilot injection of a combustion cycle is additionally cyclically modified using a test correction value, which is also output by regulator 46 as correction value d_AD. When the modification is reflected in actual value VM_VE12_actual of the sum, it may be assumed that the corresponding injection is active. In that case, everything is OK. However, if the modification is not reflected, an inactive pilot injection must be assumed. In this case another pilot injection from the same injection pattern may be shortened and the inactive pilot injection lengthened by the same amount. It is then reactivated by the lengthening. The lengthening occurs preferably in that a setpoint value for a pilot injection whose modification is not reflected in the actual value of the sum is increased at the expense of another setpoint value of another pilot injection.

When the regulating intervention takes place only on a subsequent pilot injection, the first pilot injection may be corrected prior to the regulating intervention on the second pilot injection. For this purpose, a correction value is ascertained for the first pilot injection with the second pilot injection deactivated by comparing an actual value with a setpoint value and by forming a system deviation from the comparison and therefrom a manipulated variable as a correction value. This correction value is then gated with a base value of the first pilot injection. It is also preferable if this correction value is used additionally for correcting a base value of the second pilot injection. As is conventional, it is then used as a starting value for the regulating intervention, further described, on the second pilot injection which is used for setting the combined effect. This accelerates the engagement of the regulation.

What is claimed is:

1. A control unit which controls metering of fuel to at least one combustion chamber of an internal combustion engine, including at least one combustion chamber having at least one pilot injection and one main injection per combustion cycle, combustion features being processed and an effect of a fuel quantity injected prior to the main injection being ascertained from the combustion features, the control unit being adapted to ascertain an actual value of a combined effect of at least two pilot injections per combustion cycle and to regulate an actual value to a setpoint value via an intervention on at least one of the pilot injections.

2. A control unit adapted to meter fuel into at least one combustion chamber of a combustion engine, the control unit adapted to control unit adapted to perform steps comprising:
   injecting at least one pilot injection and one main injection per combustion cycle;
   detecting combustion features;
   ascertaining an effect of a fuel quantity injected prior to the main injection from the combustion features;
   ascertaining an actual value of a combined effect for at least two pilot injections per combustion cycle; and
   regulating the actual value to a setpoint value via an intervention on at least one of the pilot injections.

3. A method for metering fuel into at least one combustion chamber of an internal combustion engine, comprising:
   injecting at least one pilot injection and one main injection per combustion cycle;
   detecting combustion features;
   ascertaining an effect of a fuel quantity injected prior to the main injection from the combustion features;
   ascertaining an actual value of a combined effect for at least two pilot injections per combustion cycle; and
   regulating the actual value to a setpoint value via an intervention on at least one of the pilot injections.

4. The method as recited in claim 3, wherein the intervention takes place on all pilot injections of a combustion cycle.

5. The method as recited in claim 4, further comprising:
modifying at least one pilot injection of a combustion cycle using a test correction value; and
checking whether the modification is reflected in the actual value of the combined effect.

6. The method as recited in claim 5, wherein a setpoint value for a pilot injection whose modification is not reflected in the actual value of the combined effect is increased at an expense of another setpoint value of another pilot injection.

7. The method as recited in claim 3, further comprising:
detecting base values of combustion features in defined subranges of a working cycle of the internal combustion engine.

8. The method as recited in claim 7, wherein the base values of combustion features are obtained from signals of one of a structure-borne noise sensor system or a combustion chamber pressure sensor system.

9. The method as recited in claim 7, wherein processed combustion features are generated from the base values of combustion features via filtering, absolute value formation, and averaging over a plurality of work cycles.

10. The method as recited in claim 9, wherein the processed combustion features are normalized to reference combustion features.

* * * * *